United States Patent

Huang

[11] Patent Number: 5,997,421
[45] Date of Patent: Dec. 7, 1999

[54] COUNTERWEIGHTING HANDLE GRIP

[76] Inventor: Ben Huang, 16652 Gemini La., Huntington Beach, Calif. 92647

[21] Appl. No.: 09/054,333

[22] Filed: Apr. 2, 1998

Related U.S. Application Data

[63] Continuation-in-part of application No. 08/822,226, Mar. 21, 1997, Pat. No. 5,797,813.

[51] Int. Cl.⁶ .................................................. A63B 49/08
[52] U.S. Cl. .......................................... 473/549; 473/302
[58] Field of Search .................................... 473/549, 300, 473/301, 302, 303

[56] References Cited

U.S. PATENT DOCUMENTS 5,827,129  10/1998  Huang ........................................ 473/301
5,851,632  12/1998  Chen et al. ............................ 473/549 X
5,857,929   1/1999  Huang ........................................ 473/549

*Primary Examiner*—Raleigh W. Chiu
*Attorney, Agent, or Firm*—Fulwider Patton Lee & Utecht, LLP

[57] ABSTRACT

A shock absorbing grip for a golf club having a strip formed of a polyurethane layer bonded to a felt layer and a pliable lead tape secured to the felt layer. The strip is spirally wrapped about a golf club handle to form a grip. The weight of the lead tape is so selected as to counterweight the golf club to provide the same swing weight as a conventional grip.

11 Claims, 8 Drawing Sheets

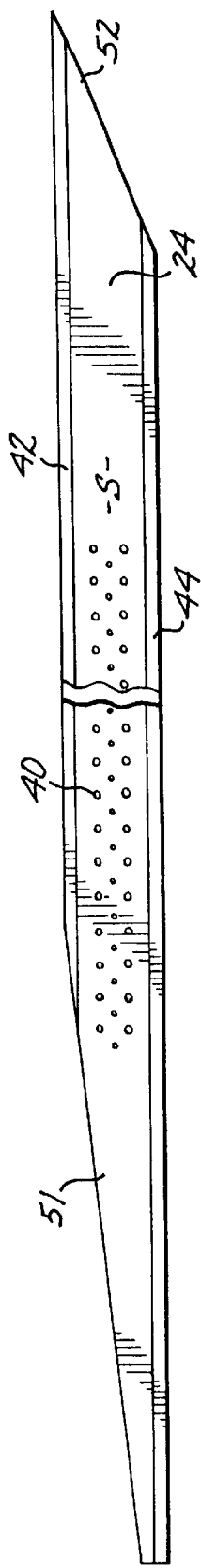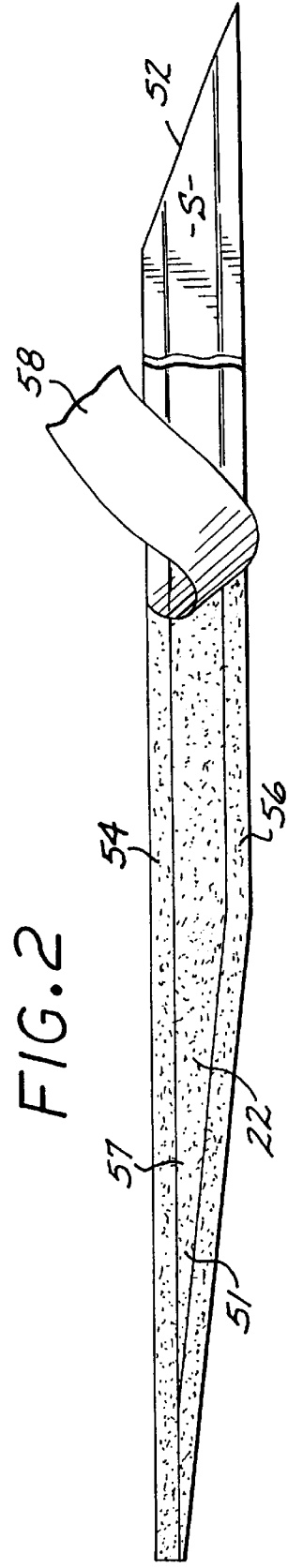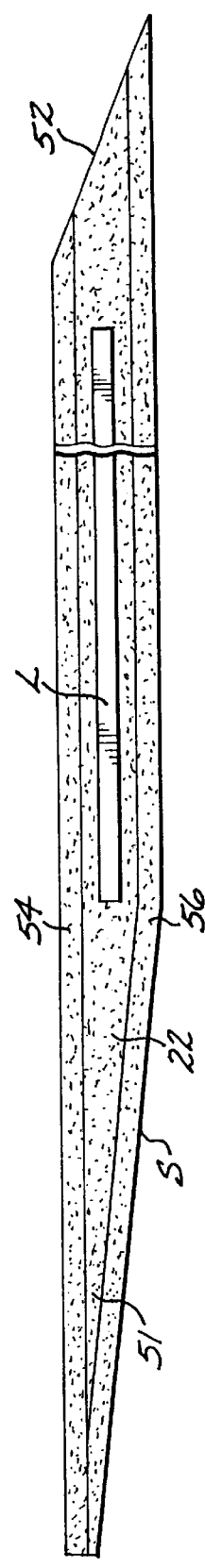

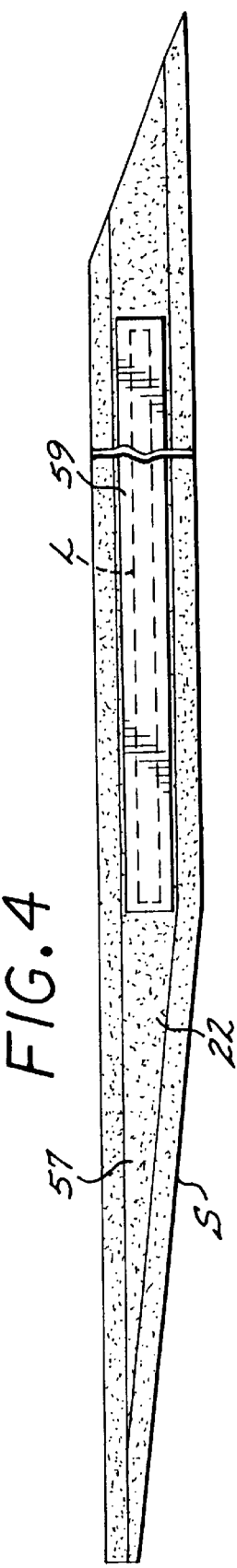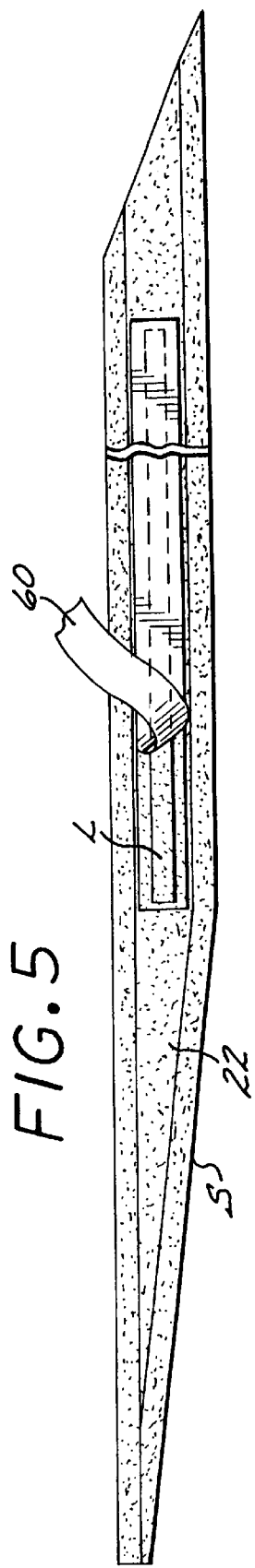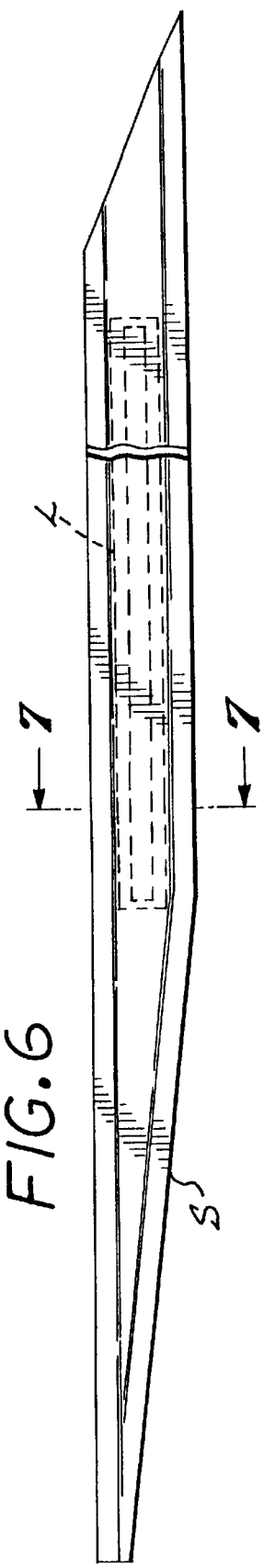

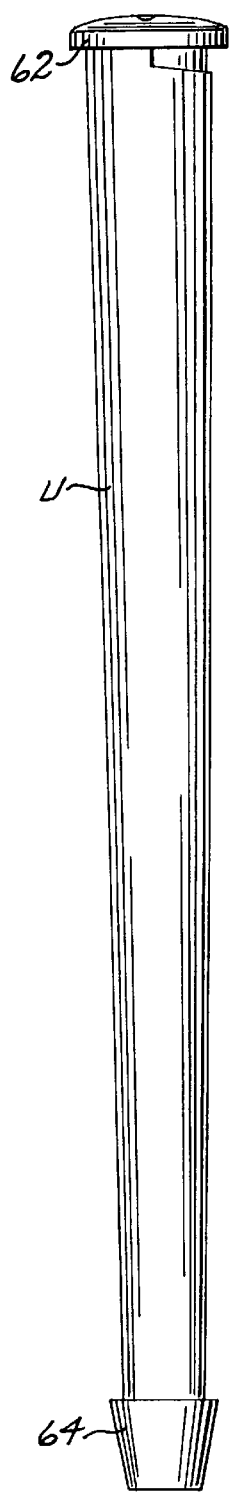
FIG.12
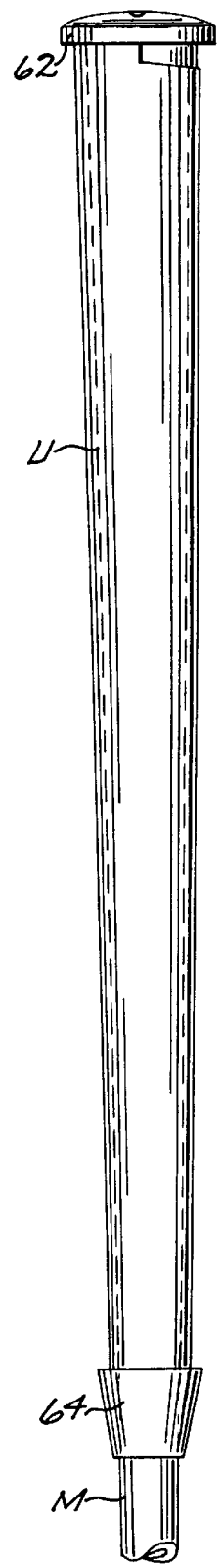
FIG.13
FIG.14
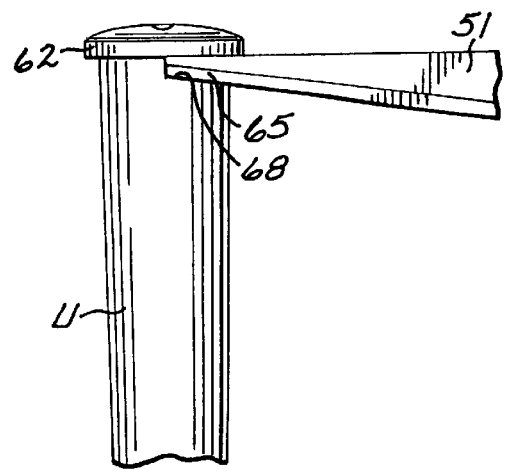
FIG.15
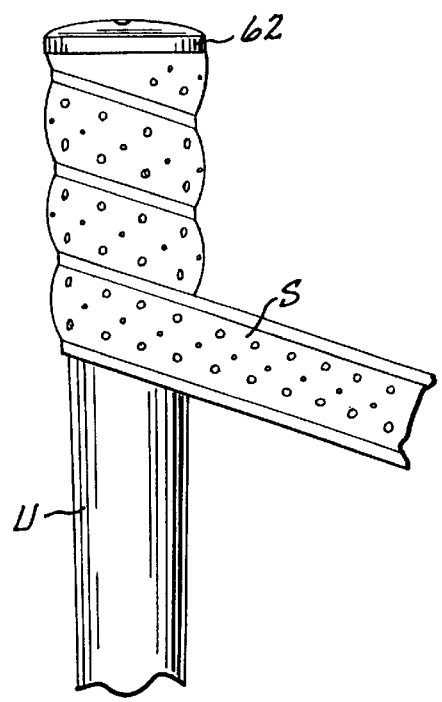

FIG.16
FIG.18
FIG.19
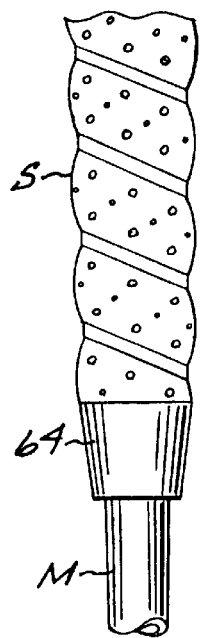
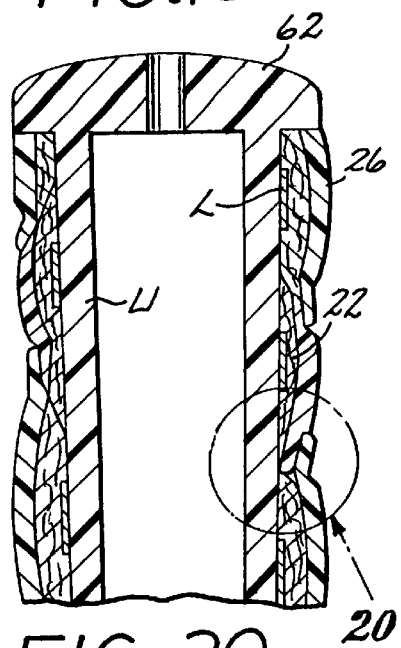
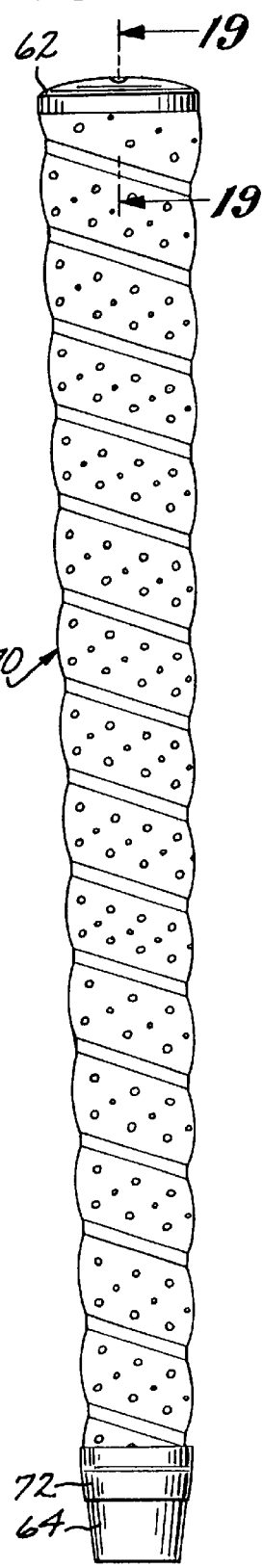
FIG.17
FIG.20
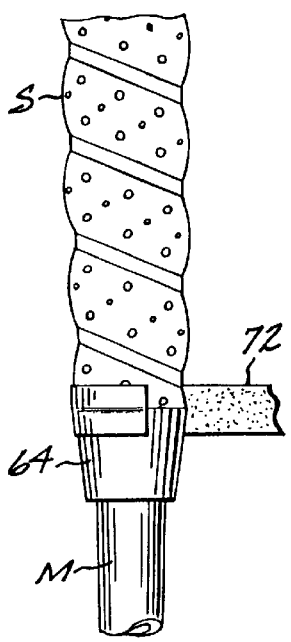
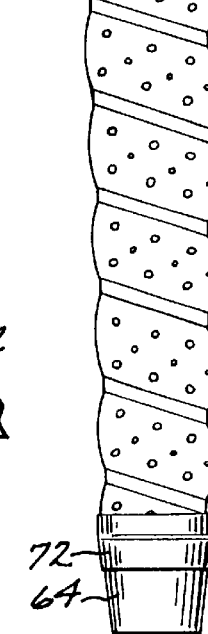
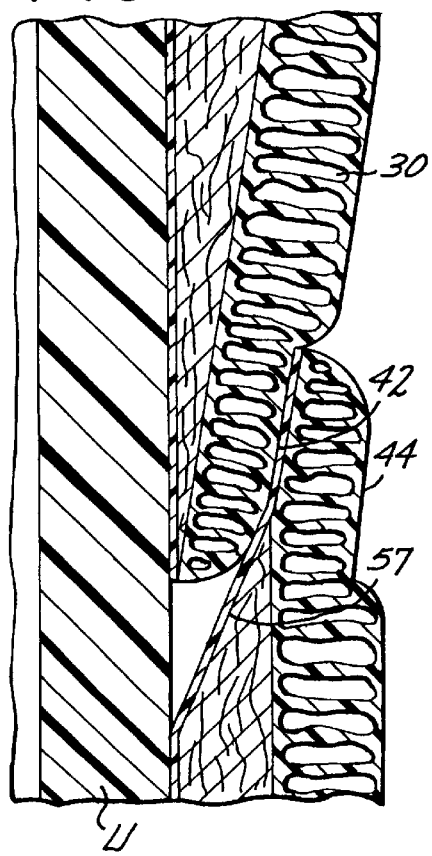

FIG. 21　FIG. 22　FIG. 25
FIG. 23
FIG. 24
FIG. 26
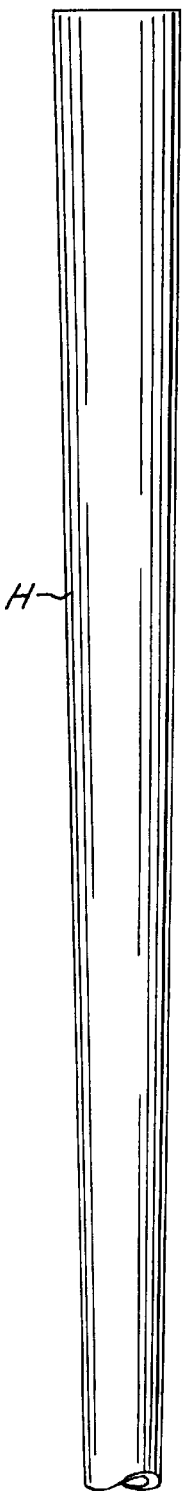
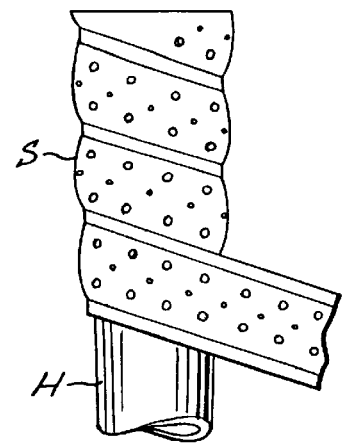
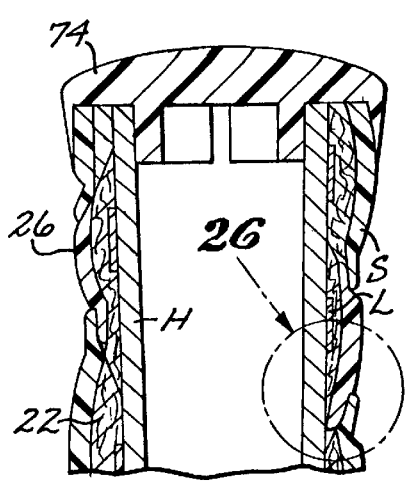
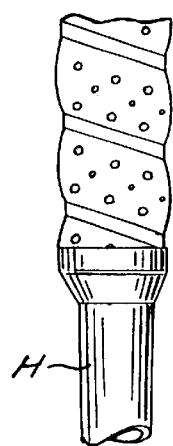
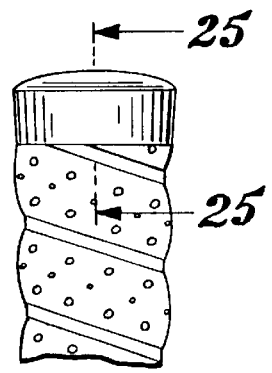
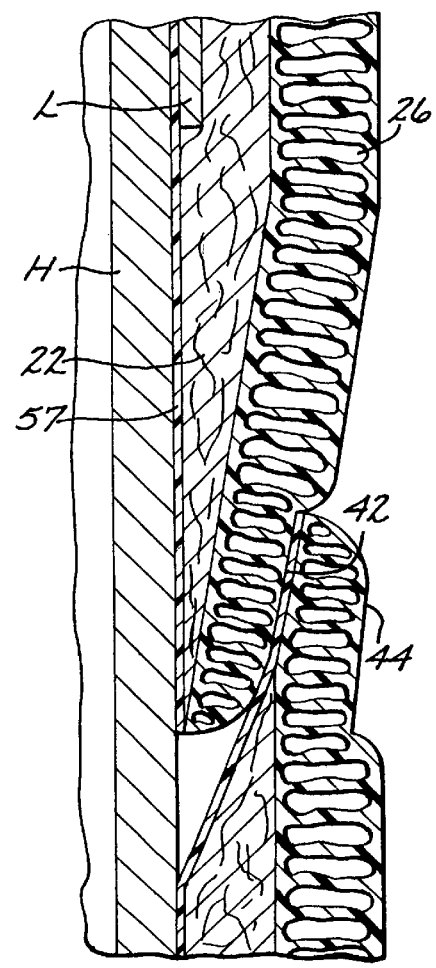

FIG. 27
FIG. 29
FIG. 28
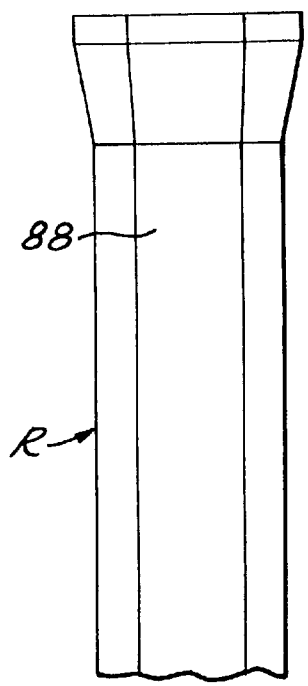
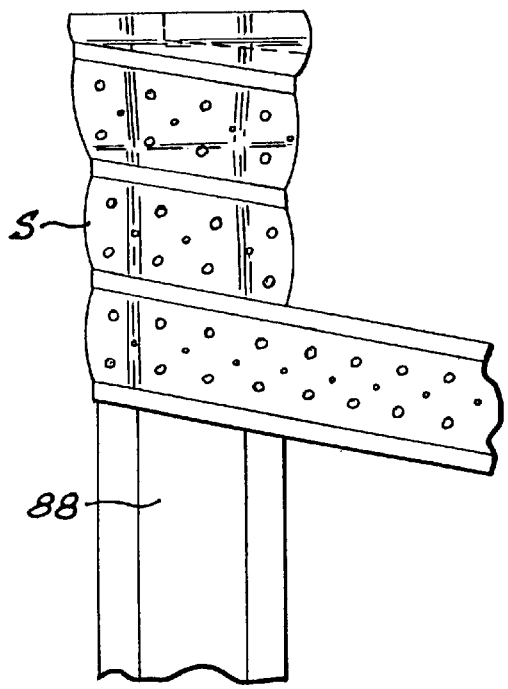
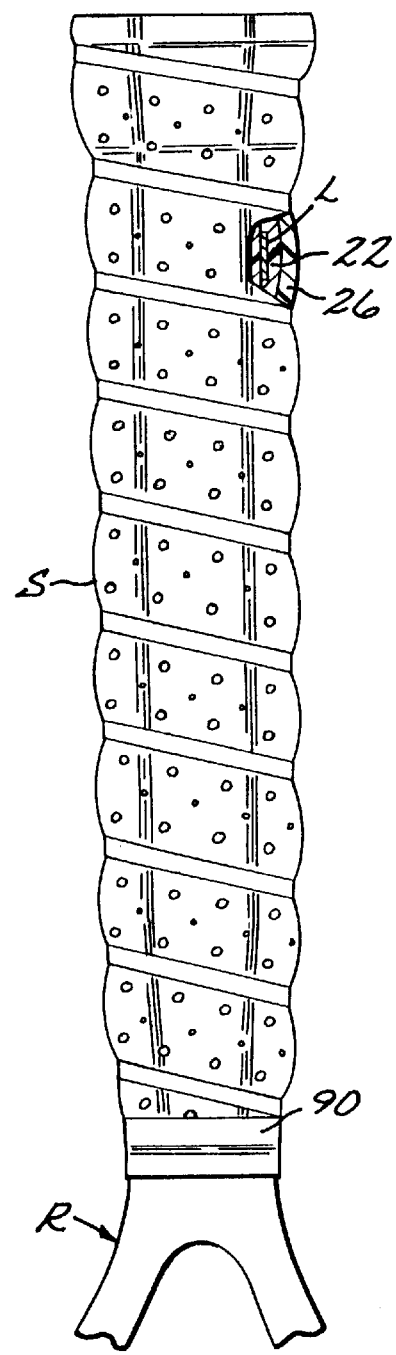

COUNTERWEIGHTING HANDLE GRIP

RELATED PATENT

This patent application is a continuation in part of my U.S. patent application Ser. No. 08/822,226 filed Mar. 21, 1997, now U.S. Pat. No. 5,797,813, issued Aug. 25, 1998.

BACKGROUND OF THE INVENTION

The present relates to an improved grip for golf clubs and other sporting equipment employing handles subject to shock when such devices are impacted, as for example, tennis racquets, racquetball racquets, and baseball bats.

It is well known that shock generated by impact as between a golf club and a golf ball or a tennis racquet and a tennis ball can adversely affect muscle tissue and afrm joints, such as elbow joints. The energy generated by such impact is usually of high frequency and short duration with rapid decay, and which is often known as "impact shock". Tight grasping of a golf club grip or tennis racquet grip to keep it from slipping a user's hands contributes to such impact shock.

Applicant has previously developed light-weight resilient grips which successfully reduce or even eliminate impact shock to the muscle and arm joints of the users of golf clubs and the like. See, for example, U.S. Pat. No. 5,374,059 granted to applicant Dec. 20, 1994, and U.S. Pat. No. 5,584,482 granted to applicant Dec. 17, 1996. Such earlier grips utilize a polyurethane layer bonded to a felt layer to define a strip which is spirally wrapped around the handle of a golf club, tennis racquet or other impact imparting devices to conform generally to the external configuration of such handle. In earlier grips of applicant's design, the thickness of the polyurethane layer relative to the thickness of the felt layer as compared to prior art resilient grips was a minimum of approximately 0.18, with the thickness of the polyurethane layer having been about equal to or thicker than the thickness of the textile layer in a typical grip of my design. Also, in some of such earlier grips, the side edges of the polyurethane-felt strip tended to unravel in use, and where the strip was not properly applied to a golf club handle, the grip would tend to loosen relative to the handle, particularly, when a golf club was withdrawn from a golf club bag. To overcome these disadvantages, my later grip designs utilized heat compressed radially inwardly extending reinforcement side edges formed in the polyurethane layer along the length of the strip. The recessed side edges also enhance the frictional grip of a user's hands on the golf club or tennis racquet. Although applicant's prior grips provide satisfactory results, under humid or rainy conditions water tended to infiltrate the felt layer causing moisture to build up on the grip which could result in a user's hands slipping relative to the grips with a result in diminished control of the golf club or tennis racquet. Similarly, perspiration moisture could also infiltrate the felt layer. Applicant solved such problems with his grips such as shown in U.S. Pat. No. 5,730,669 and disclosed in applicant's application Ser. No. 08//822,226 filed Mar. 21, 1997, now U.S. Pat. No. 5,797,813.

Applicant's aforedescribed golf club grips are lighter in weight than conventional grips. Accordingly, more weight is distributed to the golf club head thereby increasing club head speed without increasing the weight of the golf club. Such weight savings moves the center of gravity of the golf club closer to the club head, increases the club's moment of inertia, and reduces the overall weight of the club and thereby permits a higher club head speed to obtain greater golf ball travel. Less shaft twist is also achieved.

While the advantages of the light-weight characteristics of Applicant's prior grips are greatly appreciated by the majority of golfers, some golfers, and particularly golf professionals, prefer grips having conventional overall weight characteristics so as not to disturb the golf club swing mechanics to which they have become accustomed.

SUMMARY OF THE INVENTION

Applicant's light-weight polyurethane-felt grips of the present invention can be readily modified to obtain substantially the same weight characteristics that are provided by conventional heavier-weight grips. The modification employs a pliable weighted tape which is integrated into the felt layer of a polyurethane-felt strip. Such strip with its integrated weighted tape is spirally wrapped about and adhered to the handle of a golf club to obtain any desired swing rate for the golf club or other ball striking implement, such as tennis racquets, racquet ball racquets and baseball bats to control the weight relationship between the handle and the overall weight distribution of the ball striking implement.

Preferably, a pliable lead tape will be employed with applicant's polyurethane-felt strip. Such lead tape is securely embedded with the polyurethane-felt strip as to preclude loosening of the lead tape relative to the strip.

The polyurethane-felt-lead tape strip of the present invention may be spirally wrapped about a tapered resilient sleeve that has been applied to the handle of a golf club shaft. Alternatively, the strip may be directly spirally wrapped about the handle of a golf club, tennis racquet, or baseball bat. The strip may also be spirally wrapped about a tapered sleeve while the sleeve is positioned on a collapsible mandrel to provide a slip-on golf club grip that can be applied to a new golf club or can be utilized as a replacement golf club grip.

The grip of the present invention can provide a long service life, may be manufactured at a low cost, and can be readily installed by a user.

These and other features and advantages of the present advantages will become apparent from the following detailed description, when taken in conjunction with the appended drawings.

BRIEF DESCRIPTION OF THE DRAWINGS

FIG. 1 is a top plan view of a strip utilized to form a counter weighting golf club grip embodying the present invention;

FIG. 2 is a view of the underside of the strip of FIG. 1;

FIG. 3 is another view of the underside of the grip of FIG. 1 showing a pliable lead tape adhered to the felt layer;

FIG. 4 shows the lead tape covered by a double-sided adhesive-backed tape;

FIG. 5 shows the protective ribbon of the double-sided adhesive tape being peeled off the adhesive;

FIG. 6 shows the underside of a completed polyurethane-felt-lead strip embodying the present invention;

FIG. 9 is a vertical sectional view similar to FIG. 7, but showing the completed strip ready to be spirally wrapped around a golf club handle or the like;

FIG. 12 is a side elevational view of an underlisting sleeve adapted to receive any one of the strips shown in FIGS. 6–11;

FIG. 13 shows the sleeve of FIG. 12 positioned upon an expandable mandrel;

FIG. 14 is a broken side elevational view showing a strip of the present invention starting to be spirally wound around the sleeve of FIG. 12;

FIG. 15 is a view similar to FIG. 14 showing the strip being wrapped about the sleeve of FIG. 12;

FIG. 16 is a view similar to FIG. 15 showing the strip wrapped around the sleeve;

FIG. 17 is a view similar to FIG. 16 showing a finishing tape being interposed between the lower end of the spirally wrapped strip and the lower end of the sleeve;

FIG. 18 is a vertical sectional view showing a completed slip-on grip embodying the present invention;

FIG. 19 is a enlarged vertical sectional view taken along line 19—19 of FIG. 18;

FIG. 20 is a further enlarged vertical sectional view of the encircled area designated 20 in FIG. 19;

FIG. 21 is a broken side elevational view of the handle of a golf club shaft;

FIG. 22 is a broken side elevational view showing a strip embodying the present invention being spirally wrapped around the golf club shaft of FIG. 21;

FIG. 23 is a broken sectional view showing the lower portion of the strip of FIG. 18 as applied to a golf club shaft;

FIG. 24 is a broken vertical sectional view of the upper portion of a golf club shaft after a cap has been positioned at the upper end of the golf club handle;

FIG. 25 is taken in enlarged scale along line 25—25 of FIG. 24;

FIG. 26 is a further enlarged vertical sectional view of the encircled area designated 26 in FIG. 25;

FIG. 27 is a broken side elevational view of a tennis racquet handle;

FIG. 28 is a broken side elevational view showing a strip embodying the present invention being wrapped around the tennis racquet handle of FIG. 27; and FIG. 29 is a broken side elevational view showing the strip spirally wrapped about the tennis racquet handle of FIG. 27 to form a completed grip embodying the present invention.

DETAILED DESCRIPTION OF PREFERRED EMBODIMENTS

Figure 7:
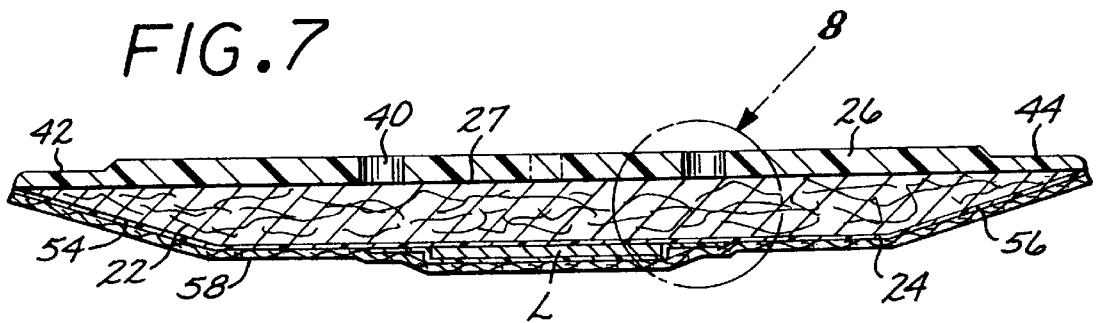
FIG. 7 is a vertical section view taken in enlarged scale taken along 7—7 of FIG. 6.

Referring to the drawings, grips embodying the present invention utilize an elongated resilient strip S which is spirally wrapped about an impact imparting implement, such as a golf club handle, a tennis racquet handle or a baseball bat. Strip S includes an open-pored felt layer, generally designated 22, having an inner or bottom surface 24 which as shown in the drawings is adhered to either an underlisting sleeve that is attached to golf club handle, to a bare golf club handle or to a tennis racquet handle. The strip S also includes a layer of a suitable resilient synthetic plastic material, such as a smooth closed pore polyurethane layer, generally designated 26, which is bonded to the felt layer 22. The bonded-together polyurethane and textile layers are seen to be configured as the unitary strip S. Strip S further includes a pliable lead tape L which is adhered to the underside of felt layer 22 for the purpose of adjusting the weight of a grip embodying the present invention in a manner to be described hereinafter.

Figure 8:
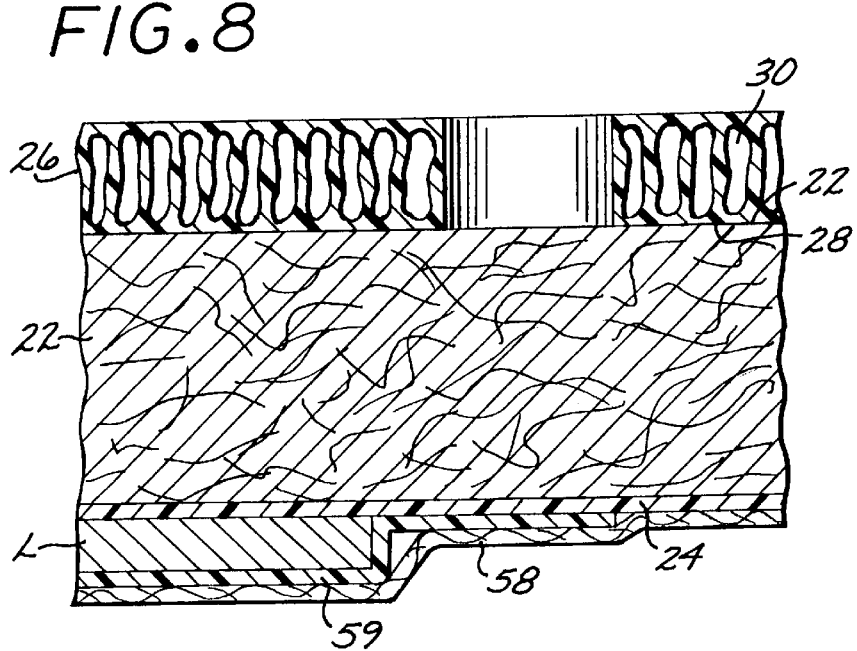
FIG. 8 is an enlarged view of the encircled area designated 8 in FIG. 7.

More particularly, and referring particularly to FIG. 8, the porous felt layer 22 has its upper or outer surface 27 bonded to the lower surface 28 of the polyurethane layer 26. The polyurethane layer 26 is formed with pores 30 which extend vertically, i.e. generally normal to the longitudinal axis of the strip S. The polyurethane layer 26 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 30 will extend generally perpendicularly relative to the longitudinal axis of the strip, while the underside 28 of the polyurethane layer 26 is bonded to the upper surface of the felt strip.

The polyurethane layer 26 provides a cushioned grasp of the player's hand on a golf club, tennis racquet handle, or baseball bat, and also enhances the player's grip by providing increased tackiness between the player's hand and the grip. The felt layer 22 provides strength to the polyurethane layer 26 and serves as a means for attaching the bonded-together polyurethane and felt strip to a handle. The polyurethane-felt layer may be formed with vertically extending perforations 40 which frictionally enhance the grasp of a user's hands on the grip. Alternatively, other types of depressions can be formed in the polyurethane layer to frictionally enhance the grip of a user's hands on the grip, e.g., tread patterns.

The strip S is shown provided with sidewardly and outwardly extending recessed side edges, generally designated 42 and 44, shown particularly in FIGS. 7 and 9–11. The recessed side edges 42 and 44 may be formed in the manner described in applicant's U.S. Pat. No. 5,730,669, and such description is incorporated herein by reference. In forming such recessed side edges a heated platen or heated rollers compress the side portions of the polyurethane layer 26 below the normal upper surface of such polyurethane layer to define the recessed reinforcement side edges 42 and 44. Such compression increases as the density and strength of the polyurethane layer in the vicinity of the side edges 42 and 44. The width of the reinforced side edges may be approximately 2 millimeters, while the depth of the major portion thereof may approximate 0.5 millimeters.

As shown in FIGS. 1, 2 and 3, the front and rear ends of the strip S are cut to define tapered starting and trailing ends 51 and 52, respectively. As shown particularly in FIGS. 7 and 9–11, the side edges of the underside of felt layer 22 are skived to form outwardly and upwardly slanted side edges 54 and 56. Preferably, slanted side edge 54 will be shorter than slanted side edge 56, e.g., side edge 54 may be 2–3 millimeters, while side edge 56 may be 5 millimeters. A method of forming the slanted side edges is fully disclosed in applicant's application Ser. No. 08/822,226 filed Mar. 21, 1997, now U.S. Pat. No. 5,797,813.

Referring to FIG. 2 an adhesive 57 is shown covering the underside of the strip. The adhesive 57 is carried by a conventional double-sided tape, and in FIG. 2, a protective ribbon 58 shown being peeled-off such adhesive. In FIG. 3, pliable lead strip L is shown on the underside of the felt layer. In FIG. 4, a conventional double-sided adhesive tape 59 is shown applied over the lead tape L, to secure such tape to the underside of felt layer 22. FIG. 5 protective ribbon 60 of the double-sided adhesive tape is shown being peeled-off the lead tape. Referring to FIG. 6, the protective peel-off ribbon 58 which was shown being removed in FIG. 2 is shown replaced over the adhesive 57 of the underside of the felt layer. The strip S is then ready to be spirally wrapped about a handle of a golf club or the like, as indicated in FIGS. 6, 7, and 8.

Figure 9:
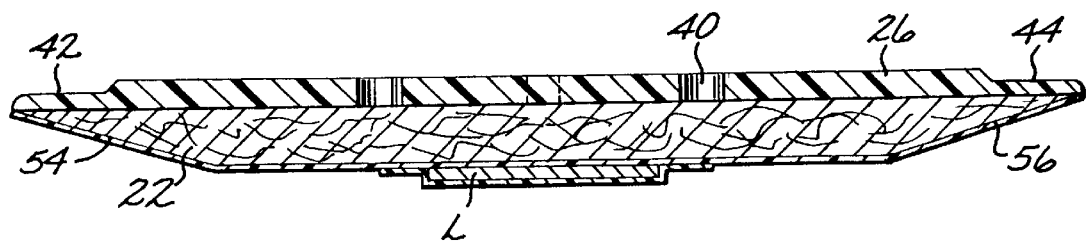

Referring to FIG. 9 the protective strip S is shown after the ribbon 58 has been peeled-off the adhesive 57 in order that the strip may be spirally wrapped about either an underslisting sleeve shown in FIGS. 12–20, a bare golf club shaft handle as shown in FIGS. 21–26 or a tennis racquet a handle as shown in FIGS. 27, 28, and 29. A suitable underlisting sleeve U is described in my aforementioned patent application Ser. No. 08/822,226 filed Mar. 21, 1997, now U.S. Pat. No. 5,797,813. Such sleeve includes, an integral cap 62 at its upper end and an integral guide cylinder 64 at its lower end.

Figure 10:
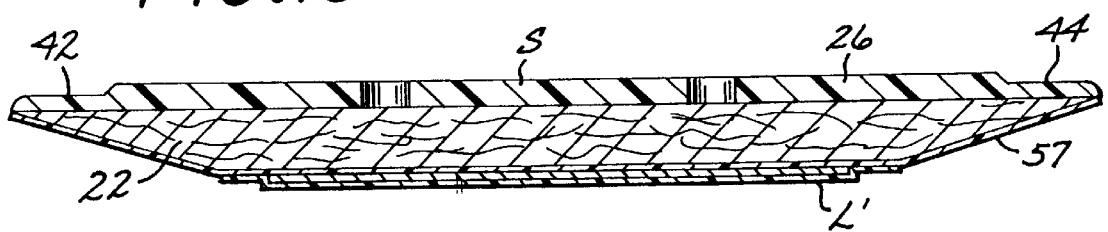
FIG. 10 is a view similar to FIG. 9 but showing a wider pliable lead tape.

Referring now to FIG. 10, strip S is shown provided with a pliable lead tape L' which is thinner and wider than strip L. The use of such thinner lead tape L' reduces the stiffness of the polyurethane-felt-lead assembly, making such assembly easier to apply to an impact imparting implement. Additionally, the overall thickness of the assembly may be kept to a minimum.

Figure 11:
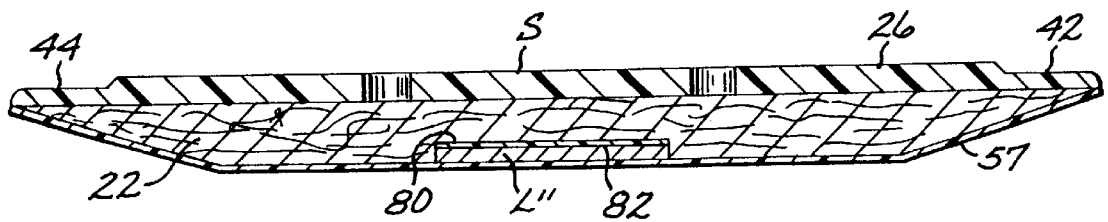
FIG. 11 is a vertical sectional view similar to FIGS. 9 and 10 showing a second embodiment of a golf club grip embodying the present invention wherein a pliable lead tape is embedded within the felt layer.

Referring now to FIG. 11, the felt layer 22 is shown with a pocket 80 that receives a pliable lead tape L". Lead tape" is secured within pocket 80 by an adhesive 82. This construction makes it possible to construct a polyurethane-felt-lead tape assembly having a minimum height for a given width.

Underlisting sleeve U of FIG. 12 is removable disposed upon a conventional collapsible mandrel M (FIG. 13) before strip S is spirally wrapped about the sleeve to provide a slip-on grip embodying the present invention. To apply the strip S to the underlisting sleeve U, the quick-release tape 58 is peeled off the adhesive 57 on the underside of the felt layer 22. The strip S is then spirally wound around the sleeve starting with the upper end of the sleeve. The tip 65 of the strip's starting end 51 is inserted in a groove 68 found in the sleeve below cap 62 and the strip is wrapped about 11/2 times around the upper end of the sleeve to provide a smooth configuration of the strip on the sleeve.

Referring to FIGS. 15–20, strip S is shown being spirally wrapped about the underlisting sleeve U. It is important to note the underside of the recessed side edges 42 and 44 of the polyurethane layer 26, overlap one another, with such edges being secured together in watertight manner by adhesive 57. The provision of the slanted side edges 54 and 56 of felt layer 22 permits such overlapping of the recessed side edges 42 and 44. The use of slanted side edges 54 and 56 having different widths permits a more pleasing longitudinal profile of the completed grip while the narrower slanted side edge 54 reduces the amount of felt cut off the felt layer thereby maintaining the strength of the completed strip. The strip S extends from the underside of cap 62 to the upper edge of guide cylinder 64. A finishing tape 72 is wrapped about the lower end of the strip and the guide cylinder to resist unwinding of the strip.

Is should be understood that where the strip S is spirally wrapped around underlisting sleeve U while the sleeve is supported on collapsible mandrel M, as shown in FIGS. 13–17, and after the strip has been spirally wrapped around the sleeve, the mandrel is collapsed and the sleeve and strip assembly axially withdrawn therefrom. The resulting assembly defines a grip 70 embodying the present invention which may be marketed as a replacement grip or as original equipment installed on a complete golf club (the so-called slip-on grip in the golf industry). When the underlisting sleeve U is slipped over the handle of a golf club, the guide cylinder 64 rigidifies the comparatively flexible lower end of the sleeve U to facilitate slipping the sleeve onto the handle.

Referring to FIGS. 21–26, strip S is shown as being spirally wrapped about a bare a handle H of a golf club shaft. Handle H may be radially expanded at a greater angle than the main portion of the golf club shaft to enhance the grasp of a golfer. This design is commonly termed a "big butt" shaft in the golf club trade.

In FIG. 22, strip S is shown being spirally wrapped about golf club handle H. Handle H is of hollow construction. FIG. 25 shows the upper end of handle H provided with a unique cap 74 shown and described in my U.S. Pat. No. 5,671,923.

Referring to FIGS. 27–29, a polyurethane-felt-lead tape strip S of the type shown in FIGS. 1–9 is shown arranged on handle 88 of a tennis racquet R. FIG. 27 shows the bare tennis racquet handle 88. In FIG. 28 strip S is shown being spirally wrapped around handle 88. In FIG. 29, the strip is shown after it has been completely spirally wound around handle 88 with its lower end secured to the handle by finishing tape 90 to define a grip G embodying the present invention. It should be noted that the projection of the pliable lead tape L below the bottom surface of the felt layer 22 provides a more pronounced profile of the completed grip G than is possible with the thinner lead tape L' of FIG. 10 or the recessed lead tape L" FIG. 11.

The utilization of a pliable lead tape on applicant's earlier polyurethane-felt strip to form a golf club grip permits custom control of the swing weight of a golf club. If a golfer has grown accustomed to using a conventional golf club grip having a certain swing weight, a pliable lead tape can be incorporated in applicant's polyurethane-felt strip to increase the swing weight of such strip to that of a conventional golf club grip. By way of example, the table herebelow sets forth the relative weight of pliable lead tape required to effect the desired results:

| Average Weight of Conventional Grip | Weight of Applicant's Polyurethane-felt Grip | Added Weight of Lead Tape To Equalize Swing | Approximate Increase In Swing Weight |
| --- | --- | --- | --- |
| 48 g | 41 g | 7 g | 2% |
| 52 g | 41 g | 11 g | 3% |
| 56 g | 4 g | 15 g | 4% |

Applicant's polyurethane-felt-lead tape grip of the present invention will provide all of the advantages of his earlier polyurethane-felt grips while counterweighting a golf club to obtain the same swing weight as a conventional grip. Applicant's polyurethane-felt-lead tape grip of the present invention will also provide a technology to custom fit the particular swing weight for a golfer. The same result can be obtained when a grip of the present invention is utilized on tennis racquets and other implement impacting devices.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. The combination of a handle of an impact imparting device and a resilient grip, for such handle, such combination comprising:

a strip consisting of an open-pored felt layer and a closed pore polyurethane layer having its inner surface bonded to the outer surface of the felt layer, and with the felt layer providing strength for the polyurethane layer while the polyurethane layer both absorbs shocks and provides tackiness so as to inhibit slippage of a user's hand relative to a handle;

a pliable lead tape adhered to the felt layer;

an adhesive applied to the underside of the felt layer; and the strip being spirally wrapped about the handle with the weight of the lead tape being preselected to control the swing weight of the impact imparting device.

2. The combination as set forth in claim 1 wherein the pliable lead tape depends from the underside of the felt layer.

3. The combination as set forth in claim 2, wherein outwardly and downwardly slanted side edges are formed along the length of the felt layer, with the underside of adjoining recessed side edges overlapping one another to define a water retarding joint between the adjoining side edges.

4. The combination as set fourth in claim 3, wherein heat compressed radially inwardly extending reinforcement side edges are formed in the polyurethane layer along the length of the strip.

5. The combination as set forth in claim 1, wherein the felt layer is formed with a pocket and the pliable lead tape is disposed within the pocket.

6. The combination as set forth in claim 5, wherein outwardly and downwardly slanted side edges are formed along the length of the felt layer, with the underside of adjoining recessed side edges overlapping one another to define a water retarding joint between the adjoining side edges.

7. The combination as set forth in claim 1, wherein outwardly and downwardly slanted side edges are formed along the length of the felt layer, with the underside of adjoining recessed side edges overlapping one another to define a water retarding joint between the adjoining side edges.

8. The combination as set forth in claim 7, wherein heat compressed radially inwardly extending reinforcement side edges are formed in the polyurethane layer along the length of the strip.

9. The combination as set forth in claim 7, wherein heat compressed radially inwardly extending reinforcement side edges are formed in the polyurethane layer along the length of the strip.

10. The combination of a handle of an impact imparting device and a resilient grip, for such handle, such combination comprising:

a strip consisting of an open-pored felt layer and a closed pore polyurethane layer having its inner surface bonded to the outer surface of the felt layer, and with the felt layer providing strength for the polyurethane layer while the polyurethane layer both absorbs shocks and provides tackiness so as to inhibit slippage of a user's hand relative to a handle;

metal weight means integrated into the strip;

an adhesive applied to the underside of the felt layer; and the strip being spirally wrapped about the handle with the magnitude of the metal weight means being preselected to control the swing weight of the impact imparting device.

11. A method of counterweighting a golf club to obtain a desired swing weight for such golf club, such method comprising the steps of calculating the average weight of a first golf club grip as compared to a second golf club grip having said desired swing weight;

providing a polyurethane-felt strip for such golf club that is lighter in weight than the first golf club grip;

adding sufficient weight integrally to such second grip to provide the desired swing weight when the polyurethane-felt grip is affixed to the golf club; and spirally wrapping the strip around the handle of a golf club.

* * * * *